US 8,903,167 B2

(12) United States Patent
Kohli et al.

(10) Patent No.: US 8,903,167 B2
(45) Date of Patent: Dec. 2, 2014

(54) SYNTHESIZING TRAINING SAMPLES FOR OBJECT RECOGNITION

(75) Inventors: Pushmeet Kohli, Cambridge (GB); Jamie Shotton, Cambridge (GB); Motaz el-Saban, Cairo (EG)

(73) Assignee: Microsoft Corporation, Redmond, WA (US)

( * ) Notice: Subject to any disclaimer, the term of this patent is extended or adjusted under 35 U.S.C. 154(b) by 624 days.

(21) Appl. No.: 13/106,831

(22) Filed: May 12, 2011

(65) Prior Publication Data

US 2012/0288186 A1 Nov. 15, 2012

(51) Int. Cl.
G06K 9/62 (2006.01)

(52) U.S. Cl.
CPC ............ G06K 9/6256 (2013.01); G06K 9/6255 (2013.01)
USPC ........... 382/155; 382/100; 382/159; 382/173; 382/276; 382/282; 382/284; 382/293

(58) Field of Classification Search
USPC ......... 382/100, 103, 155–160, 173, 181, 190, 382/209, 215–218, 224, 276, 282–284, 289, 382/291, 293, 308, 325
See application file for complete search history.

(56) References Cited

U.S. PATENT DOCUMENTS

| | | | | |
|---|---|---|---|---|
| 5,850,470 | A * | 12/1998 | Kung et al. | 382/157 |
| 6,807,286 | B1 | 10/2004 | Krumm et al. | |
| 6,975,750 | B2 * | 12/2005 | Yan et al. | 382/118 |
| 7,095,879 | B2 * | 8/2006 | Yan et al. | 382/118 |
| 7,130,776 | B2 * | 10/2006 | Ii et al. | 382/228 |
| 7,194,114 | B2 | 3/2007 | Schneiderman | |
| 7,295,700 | B2 | 11/2007 | Schiller et al. | |
| 7,489,803 | B2 | 2/2009 | Haynes et al. | |
| 7,680,330 | B2 | 3/2010 | Leung | |
| 2003/0002730 | A1 * | 1/2003 | Petrich | 382/284 |
| 2005/0175235 | A1 * | 8/2005 | Luo et al. | 382/159 |
| 2011/0002531 | A1 | 1/2011 | Heisele et al. | |

OTHER PUBLICATIONS

Benjamin Sapp, Ashutosh Saxena and Andrew Y. Ng, "A Fast Data Collection and Augmentation Procedure for Object Recognition" Proceedings of the Twenty-Third AAAI Conference on Artificial Intelligence, vol. 3, 2008, pp. 1402-1408.*
Yann LeCun, Fu Jie Huang and Léon Bottou, "Learning Methods for Generic Object Recognition with Invariance to Pose and Lighting", IEEE, Proceedings of the 2004 IEEE Computer Society Conference on Computer Vision and Pattern Recognition, vol. 2, Jul. 2004, pp. 1-8.*

(Continued)

Primary Examiner — Eric Rush
(74) Attorney, Agent, or Firm — Steve Wight; Pablo Tapia; Micky Minhas

(57) ABSTRACT

An enhanced training sample set containing new synthesized training images that are artificially generated from an original training sample set is provided to satisfactorily increase the accuracy of an object recognition system. The original sample set is artificially augmented by introducing one or more variations to the original images with little to no human input. There are a large number of possible variations that can be introduced to the original images, such as varying the image's position, orientation, and/or appearance and varying an object's context, scale, and/or rotation. Because there are computational constraints on the amount of training samples that can be processed by object recognition systems, one or more variations that will lead to a satisfactory increase in the accuracy of the object recognition performance are identified and introduced to the original images.

8 Claims, 13 Drawing Sheets

(56) References Cited

OTHER PUBLICATIONS

Breeden, et al., "Synthesizing Object-Background Data for Large 3-d Datasets", Retrieved at <<http://www.stanford.edu/class/cs229/proj2008/BreedenChigurupati-SynthesizingObject-Background-DataForLarge3-DDatasets.pdf>>, Dec. 13, 2008, pp. 5.

Hoessler, et al., "Classifier training based on synthetically generated samples", Retrieved at <<http://www.bv.e-technik.tu-dortmund.de/Publikationen/icvs07_2.pdf>>, In the Proceedings of 5th International Conference on Computer Vision Systems, Mar. 21-24, 2007, pp. 10.

Sapp, et al., "A Fast Data Collection and Augmentation Procedure for Object Recognition", Retrieved at <<http://ai.stanford.edu/~asaxena/robotdatacollection/stairdatacollection.pdf>>, In the Proceedings of the 23rd national conference on Artificial intelligence, vol. 3, 2008, pp. 7.

Varga, et al., "Off-line Cursive Handwriting Recognition Using Synthetic Training Data", Retrieved at <<http://citeseerx.ist.psu.edu/viewdoc/download?doi=10.1.1.92.9920&rep=rep1&type=pdf>>, Jan. 31, 2006, pp. 122.

"Amazon Mechanical Turk", Retrieved at <<https://www.mturk.com/mturk/>>, Retrieved Date: Mar. 1, 2011, p. 1.

Cano, et al., "Training Set Expansion in Handwritten Character Recognition", Retrieved at <<http://citeseerx.ist.psu.edu/viewdoc/download?doi=10.1.1.20.311&rep=rep1&type=pdf>>, In the Proceedings of the Joint IAPR International Workshop on Structural, Syntactic, and Statistical Pattern Recognition, 2002, pp. 548-556.

Chawla, et al., "SMOTE: Synthetic Minority Over-Sampling Technique", Retrieved at <<http://www.jair.org/media/953/live-953-2037-jair.pdf>>, In the Journal of Artificial Intelligence Research, vol. 16, Issue 1, Jan. 2002, pp. 321-357.

Criminisi, et al., "Region Filling and Object Removal by Exemplar-based Inpainting", Retrieved at <<http://citeseerx.ist.psu.edu/viewdoc/download?doi=10.1.1.67.9407&rep=rep1&type=pdf>>, In the Proceedings IEEE Transactions on Image Processing, vol. 13, No. 9, Sep. 2004, pp. 1-13.

"VOC 2010 Challenge", Retrieved at <<http://pascallin.ecs.soton.ac.uk/challenges/VOC/voc2010/index.html>>, Retrieved Date: Mar. 1, 2011, pp. 9.

Everingham, et al., "The PASCAL Visual Object Classes (VOC) Challenge", Retrieved at <<http://pascallin.ecs.soton.ac.uk/challenges/VOC/pubs/everingham10.pdf>>, In the Proceedings of International Journal of Computer Vision, Sep. 9, 2009, pp. 303-338.

Felzenszwalb, et al., "Object Detection with Discriminatively Trained Part based Models", Retrieved at <<http://citeseerx.ist.psu.edu/viewdoc/download?doi=10.1.1.153.2745&rep=rep1&type=pdf>>, In the Proceedings IEEE Transactions on Pattern Analysis and Machine Intelligence, Sep. 22, 2009, pp. 1-20.

Hoiem, et al., "Putting Objects in Perspective", Retrieved at <<http://www.cs.uiuc.edu/homes/dhoiem/publications/hoiem_cvpr06.pdf>>, 2006, pp. 8.

Jia, et al., "Drag and Drop Pasting", Retrieved at <<http://www.cse.cuhk.edu.hk/~leojia/all_project_webpages/ddp/dragdroppasting.pdf>>, In the Proceedings of ACM SIGGRAPH 2006, vol. 25 Issue 3, Jul. 2006, pp. 631-636.

Johnson, et al., "Semantic Photo Synthesis", Retrieved at <<http://mi.eng.cam.ac.uk/reports/svr-ftp/brostow_Eurographics06.pdf>>, In the Proceedings of Computer Graphics Forum, Sep. 2006, pp. 1-9.

Lalonde, et al., "Photo Clip Art", Retrieved at <<http://graphics.cs.cmu.edu/projects/photoclipart/lalonde_siggraph_07.pdf>>, In the Proceedings of ACM Transactions on Graphics, SIGGRAPH, Aug. 2007, pp. 1-10.

Lepetit, et al., "Randomized Trees for Real Time Keypoint Recognition", Retrieved at <<http://cvlab.epfl.ch/~lepetit/papers/lepetit_cvpr05.pdf>>, In the Proceedings of the IEEE Computer Society Conference on Computer Vision and Pattern Recognition, vol. 2, 2005, pp. 7.

Nonnemaker, et al., "Using Synthetic Data Safely in Classification", Retrieved at <<http://www.cse.lehigh.edu/~baird/Pubs/drr09_jen_paper.pdf>>, Jan. 19, 2009, pp. 7.

Shotton, et al., "Semantic Texton Forests for Image Categorization and Segmentation", Retrieved at <<http://ieeexplore.ieee.org/stamp/stamp.jsp?tp=&arnumber=4587503>>, In the Proceedings of IEEE Conference on Computer Vision and Pattern Recognition, Jun. 23-28, 2008, pp. 1-8.

Shotton, et al., "Textonboost for Image Understanding: Multi-class Object Recognition and Segmentation by Jointly Modeling Texture, Layout, and Context", Retrieved at <<http://citeseerx.ist.psu.edu/viewdoc/download?doi=10.1.1.126.149&rep=rep1&type=pdf>>, In the Proceedings of International Journal of Computer Vision, vol. 81 Issue 1, Jan. 2009, pp. 1-30.

Varga, et al., "Generation of Synthetic Training Data for an HMM-based Handwriting Recognition System", Retrieved at <<http://www.cse.salford.ac.uk/prima/ICDAR2003/Papers/0112_441_varga_t.pdf>>, In the Proceedings of the Seventh International Conference on Document Analysis and Recognition, 2003, pp. 5.

Varga, et al., "Comparing Natural and Synthetic Training Data for Off-line Cursive Handwriting Recognition", Retrieved at http://ieeexplore.ieee.org/stamp/stamp.jsp?tp=&arnumber=1363914>>, In the Proceedings of the 9th Int'l Workshop on Frontiers in Handwriting Recognition, 2004, pp. 5.

Weyrauch, et al., "Component-based Face Recognition with 3D Morphable Models", Retrieved at <<http://citeseer.ist.psu.edu/viewdoc/download;jsessionid=E7EF559ABFA38079C209DE00EDA53B69?doi=10.1.1.2.4800&rep=rep1&type=pdf>>, 2003, pp. 1-5.

Yu, et al., "Improving Person Detection using Synthetic Training Data", Retrieved at <<http://ieeexplore.ieee.org/stamp/stamp.jsp?tp=&arnumber=5650143>>, In the Proceedings of IEEE 17th International Conference on Image Processing, Sep. 26-29, 2010, pp. 3477-3480.

Rother, et al., "GrabCut—Interactive Foreground Extraction using Iterated Graph Cuts", ACM Transactions on Graphics (TOG)—Proceedings of ACM SIGGRAPH 2004, vol. 23, Issue 03, Aug. 2004, pp. 6.

Lecun, et al., "Learning Methods for Generic Object Recognition with Invariance to Pose and Lighting", Proceedings of the 2004 IEEE Computer Society Conference on Computer Vision and Pattern Recognition, vol. 02, Jun. 27-Jul. 2, 2004, pp. 1-8.

\* cited by examiner

SYNTHESIZING TRAINING SAMPLES FOR OBJECT RECOGNITION

BACKGROUND

Computer vision allows computing systems to understand an image or a sequence of images (e.g., video) by extracting information from the image. The ability of a computing system to accurately detect and localize objects in images has numerous applications, such as content-based searching, targeted advertisements, and medical diagnosis and treatment. It is a challenge, however, in object recognition methods and systems, to teach the computing system to detect and localize particular rigid or articulated objects in a given image.

Object recognition methods and systems operate based on a given set of training images that have been annotated with the location and type of object shown in an image. However, gathering and annotating training images is expensive, time consuming, and requires human input. For example, images of certain object types may be gathered using textual queries to existing image search engines that are filtered by human labelers that annotate the images. Such approaches are expensive or unreliable for object localization and segmentation because human interaction is required to provide accurate bounding boxes and segmentations of the object. Alternatively, algorithms requiring less training data may be used for object localization and segmentation. The algorithms identify particular invariant properties of an object to generalize all modes of variation of the object from existing training data. However, the accuracy of object recognition systems increases with the amount of training data. Accordingly, it is a challenge to develop large enough training sample sets to obtain satisfactory results.

SUMMARY

Implementations described and claimed herein address the foregoing problems by providing an enhanced training sample set containing new synthesized training images that are artificially generated from an original training sample set. The original sample set is artificially augmented by introducing one or more variations to the original images with little to no human input. There is a large number of possible variations that can be introduced to the original images to create a new and larger training set of images. Such variations include without limitation varying an image's position, orientation, and/or appearance (e.g., brightness) and/or varying the context, scale, and/or rotation of one or more objects in an image. Because there are computational constraints on the amount of training data that can be processed by object recognition systems, one or more variations that will lead to a satisfactory increase in the accuracy of the object recognition performance (e.g., the highest increase in accuracy) are identified and applied to the original images to create an enhanced training sample set.

In some implementations, articles of manufacture are provided as computer program products. One implementation of a computer program product provides a tangible computer program storage medium readable by a computing system and encoding a processor-executable program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
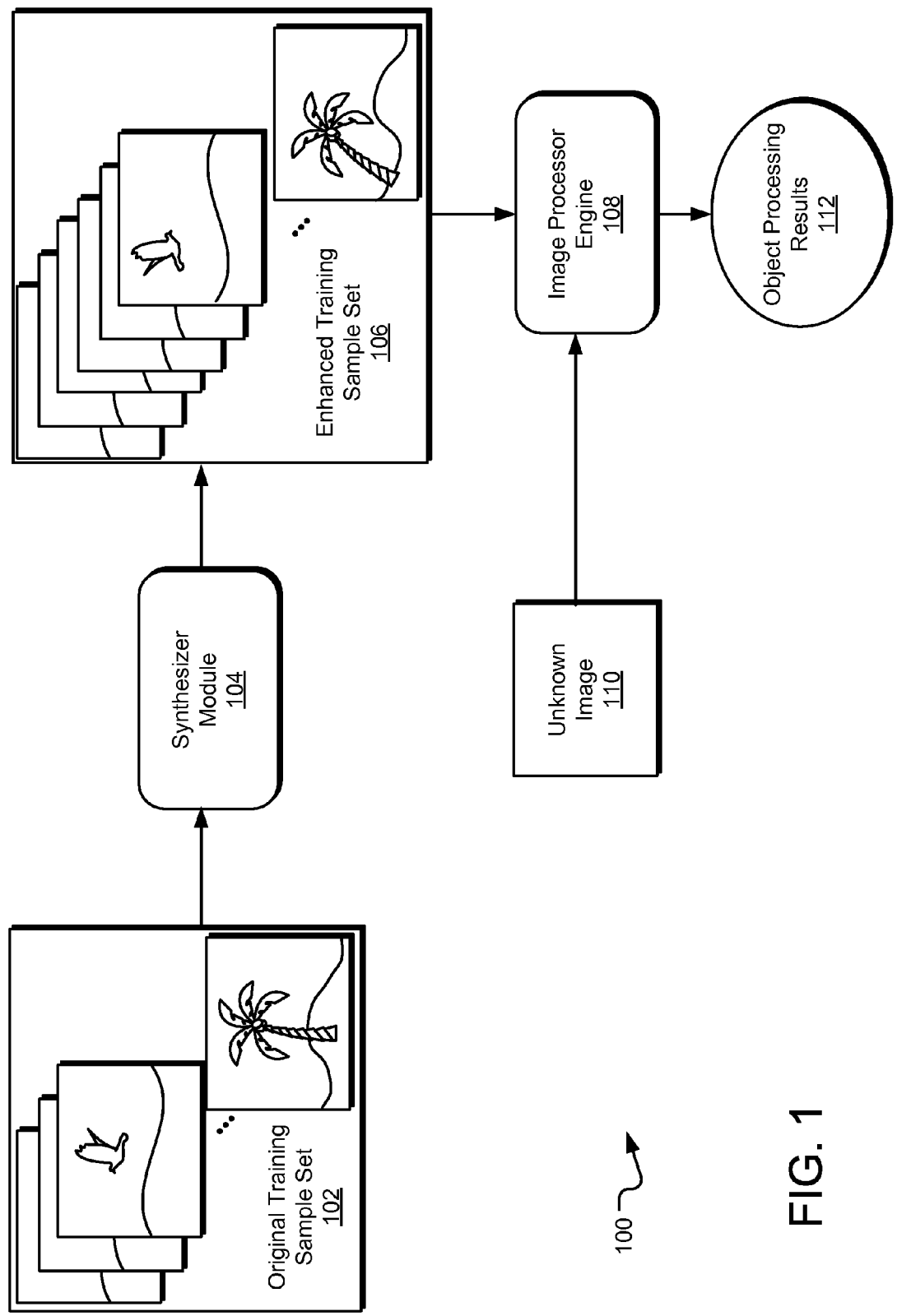
FIG. 1 illustrates an example object recognition system providing an enhanced training sample set for object processing.

FIG. 1 illustrates an example object recognition system 100 providing an enhanced training sample set for object processing. The object recognition system 100 includes original training sample set 102, which is a set of training images and annotations for one or more object classes. The training images contained in the original training sample set 102 may be annotated by using a manual labeling method to identify objects in each training image. The training images may be annotated, for example, using image-level annotation, bounding box annotation, and/or segmentation annotation. However, other annotations including without limitation rotated rectangles or other shapes are contemplated.

Image-level annotation identifies an image as containing one or more particular objects. Bounding box annotation identifies an object as being enclosed within a particular rectangle in the image. Pixels belonging to the object may be extracted from the background using background-foreground extraction methods, which may be automatic, semi-automatic, or manual methods (e.g., by using a program such as GrabCut). Using segmentation annotation, each pixel is given an object label or non-object label. For example, the original training sample set 102 includes a training image with a palm tree and a training image with a bird. Using image-level annotation, the training image with the palm tree is labeled as an image containing a palm tree, and similarly the training image with the bird is labeled as an image containing a bird. Bounding box annotation identifies the bird or the palm tree as being enclosed within a particular rectangle in the respective images. Using segmentation annotation, each pixel in the training image containing the bird is identified with a bird or non-bird label, and each pixel in the training image containing the palm tree is identified with a palm tree or non-palm tree label. The original training sample set 102 may be used to construct one or more object recognition models for image processing. In an implementation, the one or more object recognition models may employ operations for learning multiple instances of an object, where the training images are annotated with some uncertainty in the unlabeled regions.

In an implementation, the original training sample set 102 is input into a synthesizer module 104 to generate synthesized training images from the original training sample set 102. The synthesizer module 104 applies one or more synthesizer models, including without limitation global transform models, object transform models, and object relocation models, to the original training sample set 102 to generate synthesized training images. For example, the images may be globally rotated or scaled and/or an object may be relocated to a different region, either within the same image or in a different image. Different selection criteria may also be employed to determine the appropriate region into which a specific object is relocated.

The synthesized training images, together with the original sample set 102, are collected into an enhanced training sample set 106, which teaches the object recognition models new variations of objects of interest. For example, the enhanced training sample set 106 includes variations of the palm tree and bird training images from the original training sample set 102—the palm tree has been rotated and relocated to another location within the same training image, and the training image with the bird has been globally transformed (e.g., flipped horizontally). The annotations within a training image are transformed or relocated in the same manner as the object. Accordingly, manual or human input and/or intervention (e.g., labeling) is unnecessary for the synthesized training images, so the amount of training data is increased without human input.

The object recognition models are trained by the enhanced training sample set 106 and are implemented by an image processor engine 108. Based on the training, the image processor engine 108 may perform object detection operations, object segmentation operations, object classification operations, and/or other object recognition operations for various object types. Object detection locates an object in a given image and may identify the object by placing a bounding box around the object. Object segmentation precisely identifies an object in a given image by selecting the pixels in the image that belong to the object. Object classification determines whether a given image contains an object belonging to a particular class and labels the object according to that class.

In an implementation, an unknown image 110 is input into the image processor engine 108, which performs object classification, detection, and/or segmentation operations on the unknown image 110 based on the training provided by the enhanced training sample set 106. The image processor engine 108 outputs object processing results 112. The object processing results 112 may include a detected, segmented, and/or classified object from the unknown image 110, which may be presented in a graphical user interface, data readout, data stream, etc.

Figure 2:
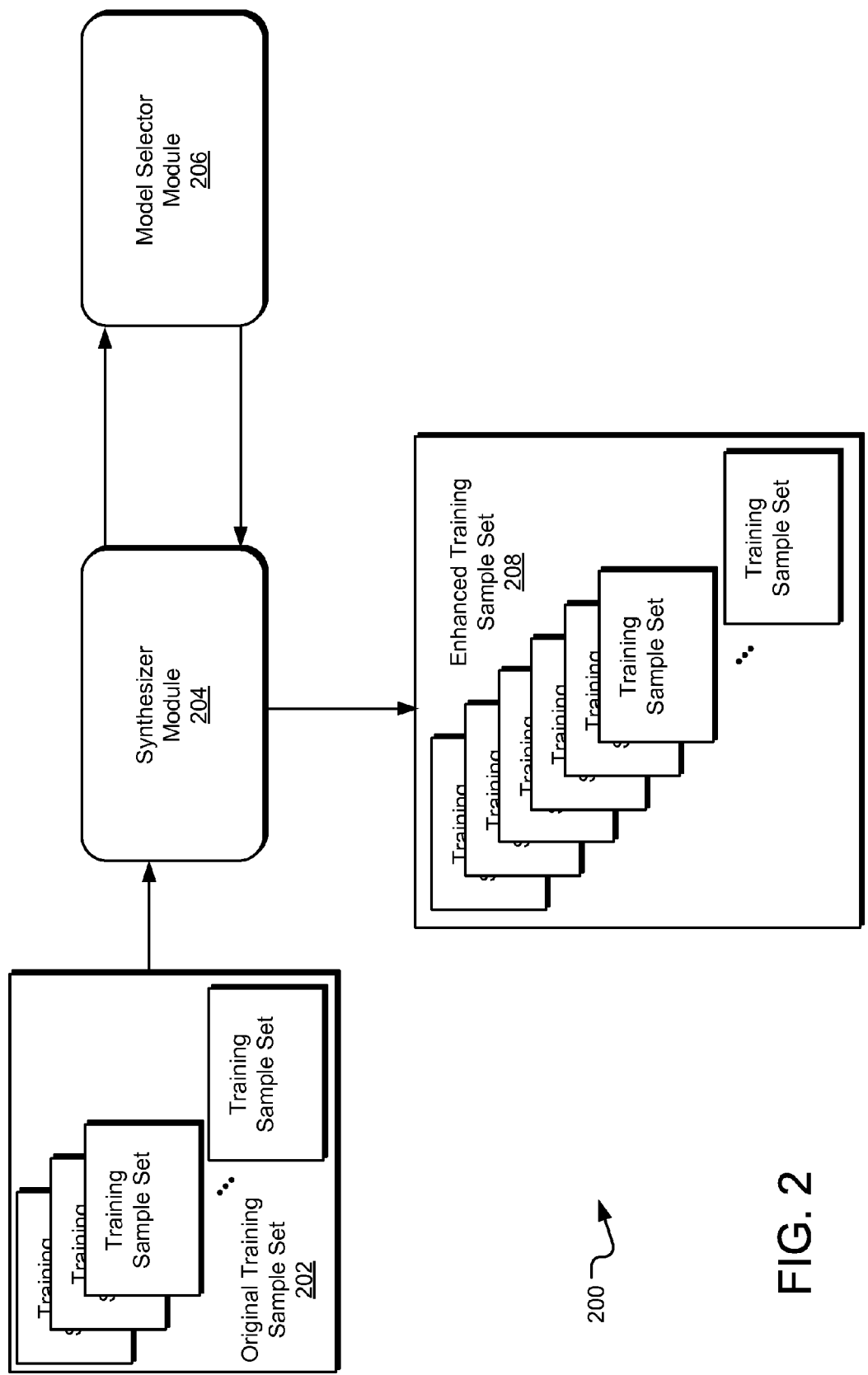
FIG. 2 illustrates example components in an object recognition system for selecting one or more synthesizer models to output an enhanced training sample set.

FIG. 2 illustrates example components in an object recognition system 200 for selecting one or more synthesizer models to output an enhanced training sample set. The object recognition system 200 includes an original training sample set 202, which is a set of training images and annotations for one or more object classes. The original training sample set 202 is input into a synthesizer module 204, which employs one or more synthesizer models to generate synthesized training images. The synthesizer models may include without limitation global transform models, object transform models, and object relocation models. For example, an object may be relocated to another image region, either within the original training image or to another background.

Based on the synthesizer models, the synthesizer module 204 collects training sample sets containing new synthesized training images that are generated from the original training sample set 202. The new training sample sets may be used to construct one or more object recognition models. However, the object recognition models based on the training sample sets may have varying degrees of performance across different object classes. The variance in performance across different object classes results from different degrees of intra-class variation, the necessity of context for certain object classes within a training image, and the comprehensiveness of the available training samples for each object class. Accordingly, a model selector module 206 analyzes the training sample sets output from the synthesizer module 204 based on the synthesizer models to arbitrate between the synthesizer models on a per class basis. The model selector module 206 validates the training sample sets based on the synthesizer models by determining which of the synthesizer models improves the performance of the object recognition system 200 for each object class. In one implementation, the training sample sets are tested against a validation set to determine the accuracy of the object recognition performance of the object recognition system 200 based on each training sample set. The model selector module 206 selects the synthesizer model(s) that contain one or more variations to the original training sample set 202 that lead to a satisfactory increase in the accuracy of the object recognition performance of the object recognition system 200 for each object class. For some object classes, the original training sample set 202, un-augmented by a synthesizer model, may lead to an object recognition model with a satisfactorily increased accuracy (e.g., the highest accuracy).

It should be understood that a satisfactory increase in accuracy may be defined by an accuracy condition. For example, the object recognition system 200 may set an accuracy condition, wherein the highest accuracy satisfies the condition. Alternatively, an accuracy condition may be set to a threshold (e.g., 95%), such that any set of models that result in an accuracy above 95% may be selected. Other accuracy conditions may also be employed.

The model selector module 206 generates feedback to the synthesizer module 204 by identifying which synthesizer model(s), if any, should be applied to the original training sample set 202 for each object class to construct object recognition models with satisfactorily increased performance accuracy. The synthesizer module 204 applies the selected synthesizer model(s) to the object classes in the original training sample set 202 to output an enhanced training sample set 208. The enhanced training sample set 208 may include the original training sample set 202 in addition to the synthesized training images generated for each class. The enhanced training sample set 208 includes selected training sample sets for each object class that may be used to construct object recognition model(s) that have a satisfactorily increased accuracy in performing object recognition operations for each class. By selecting the variations to apply to the original training sample set 202 for each object class, the accuracy of the object recognition system 200 is significantly increased without human input.

Figure 3:
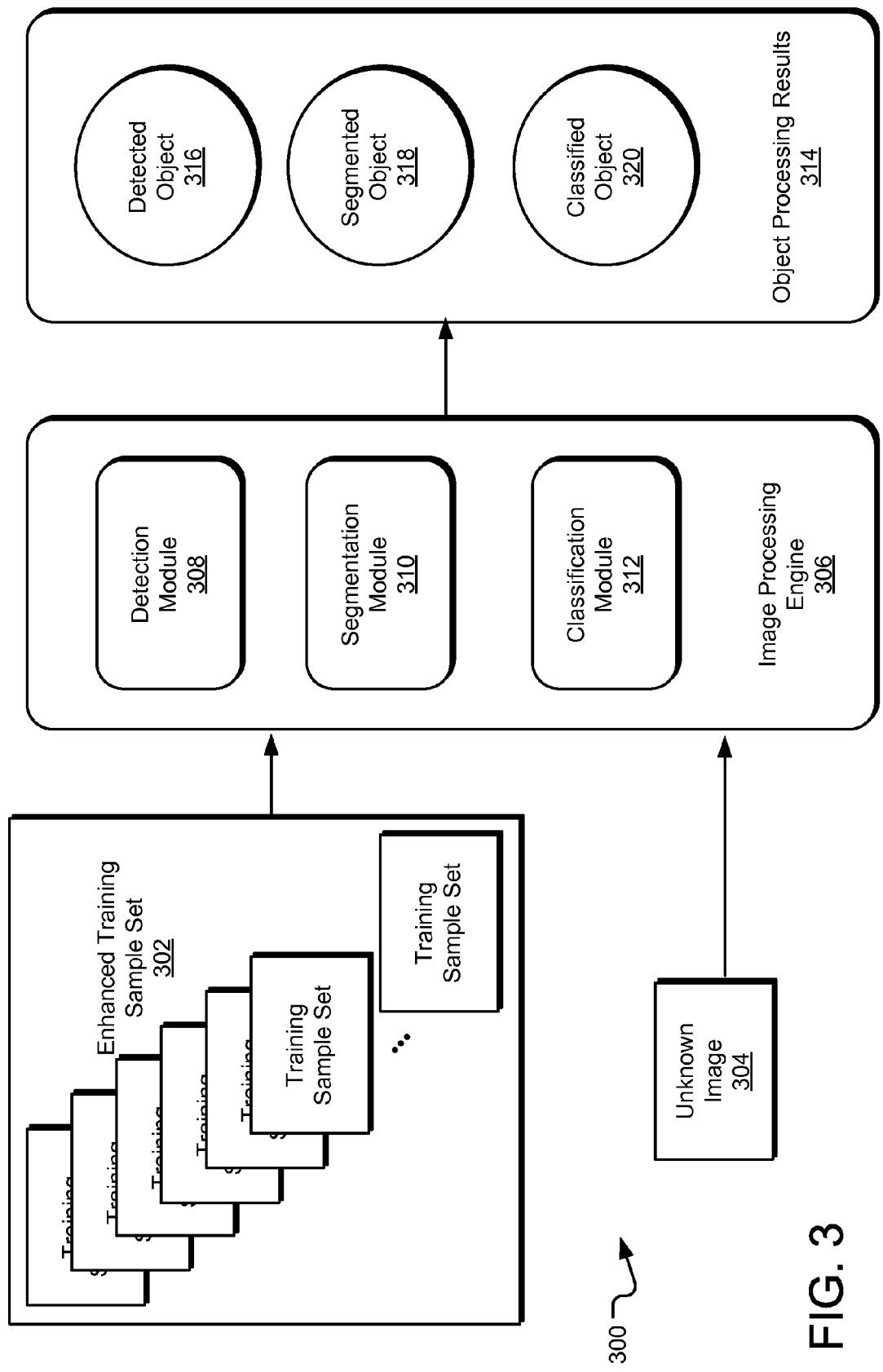
FIG. 3 illustrates example components in an object recognition system for outputting object processing results based on an enhanced training sample set.

FIG. 3 illustrates example components in an object recognition system 300 for outputting object processing results based on an enhanced training sample set. The object recognition system 300 includes an enhanced training sample set 302, which includes training sample sets for each object class. The enhanced training sample set 302 is input into an image processing engine 306 to train the image processing engine 306 to perform various object recognition operations. Based on the training from the enhanced training sample set 306, the image processing engine 306 constructs one or more object recognition models, which have improved performance accuracy for each object class.

In one implementation, an unknown image 304 is input into the image processing engine 306. The unknown image 304 may have one or more objects belonging to various object classes. The image processing engine 306 implements the object recognition models constructed from the enhanced training sample set 302 to perform object recognition operations on the unknown image 304.

The image processing engine 306 includes a detection module 308, a segmentation module 310, and a classification module 312, which execute the object recognition models to perform the object recognition operations, such as detection, segmentation, and classification, for various object types. The image processing engine outputs object processing results 314, which include one or more of a detected object 316, a segmented object 318, and/or a classified object 320. The object processing results 314 may be presented in a graphical user interface, data readout, data stream, etc.

For example, the detection module 308 processes the unknown image 304 to locate an object in the unknown image 304. The detection module 308 executes the object recognition models for various object classes to determine if the unknown image 304 contains any known objects. The detection module 308 outputs the detected object 316 within the unknown image 304. In one implementation, the detected object 316 is identified by a bounding box placed around the detected object 316.

The segmentation module 310 processes the unknown image 304 to precisely identify an object in the unknown image 304 by selecting which pixels in the unknown image 304 belong to the object. The segmentation module 310 executes the object recognition models for various object classes to determine the precise boundaries of a particular object in the unknown image 304. The segmentation module 310 outputs the segmented object 318 within the unknown image 304. In one implementation, the segmented object 318 is outlined within the unknown image 304. In another implementation, the segmentation module 310 uses a segmentation mask to cut the segmented object 318 from the unknown image 304.

The classification module 312 processes the unknown image 304 to determine whether the unknown image 304 contains an object belonging to a particular object class. The classification module 312 executes the object recognition models for various object classes to determine which object classes the unknown image 304 contains objects belonging to. The classification module 312 outputs the classified object 320 from the unknown image 304. In one implementation, the unknown image 304 is identified as containing the classified object 320 belonging to a particular object class.

Figure 4:
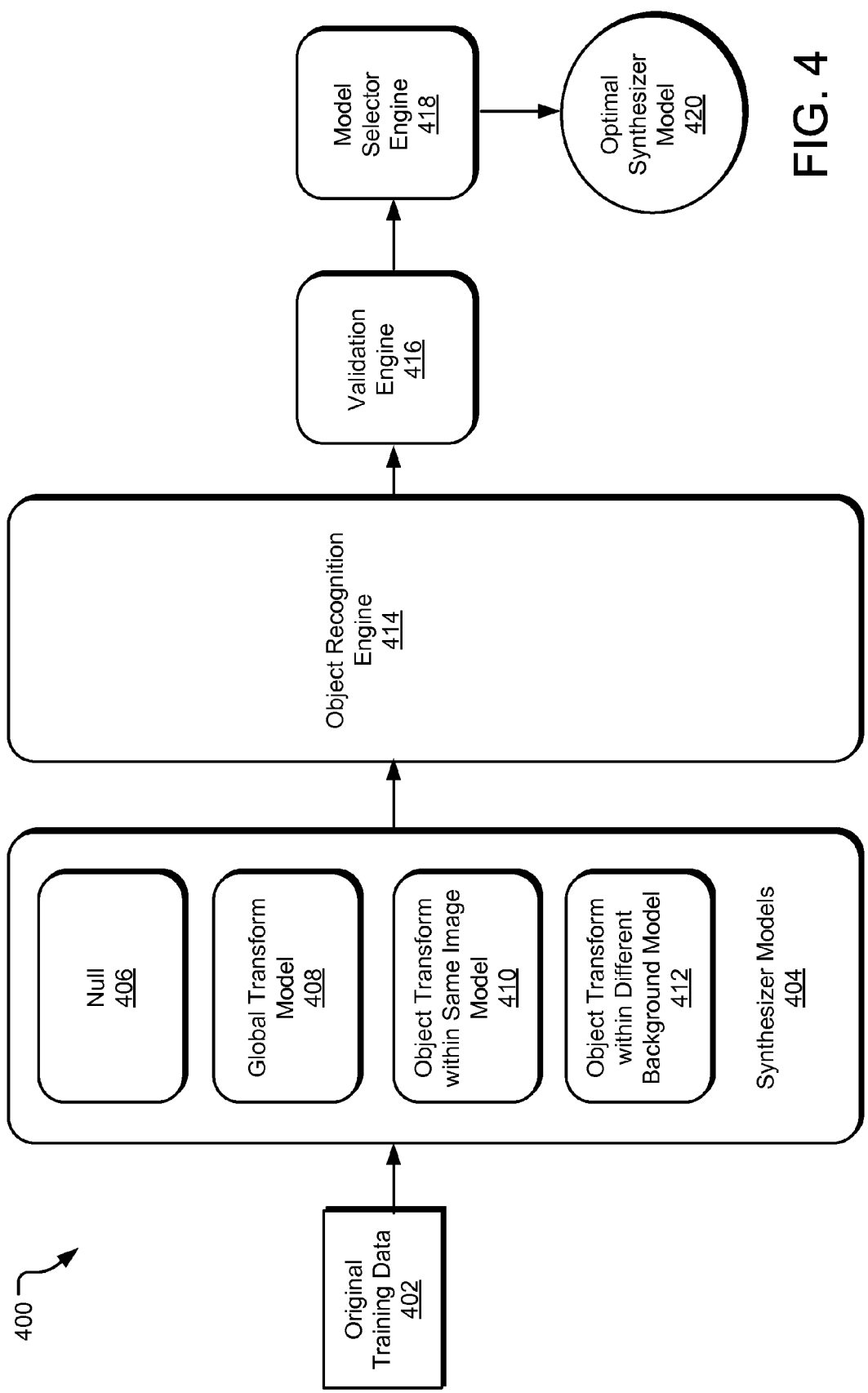
FIG. 4 illustrates an example model selection system for identifying one or more synthesizer models for each object class in an object recognition operation.

FIG. 4 illustrates an example model selection system 400 for identifying one or more synthesizer models for each object class in an object recognition operation. The model selection system 400 includes original training samples 402, containing training images with objects from various object classes. The training images contained in the original training samples 402 are annotated to identify objects in each training image.

One or more synthesizer models 404 are applied to the original training samples 402 to obtain a collection of synthesized training sample sets for each object class. When one or more of the synthesizer models 404 is applied to the original training samples 402, the annotations within each training image of the original training samples 402 are transformed or otherwise augmented according to the synthesizer model applied to the image. The synthesizer models 404 include a null model 406, a global transform model 408, an object transform within a same image model 410, and an object transform within a different background model 412. The object transform within a same image model 410 and the object transform within the different background model 412 are examples of object-based transform models. Object-based transform models constrain transforms to pixels in or associated with an object, in contrast to global transforms models, which perform transforms on an entire image. However, other synthesizer models based on one or more variations to a training image or other object based transforms may be applied to the original data 402. For example, a synthesizer model that adds new objects to a training image from a preset database may be applied to the original training samples 402, in combination with one or more of the synthesizer models 406, 408, 410, and 412. The new objects may be added to vary the image context of an object. Additionally, each training image in the synthesized training sample sets may be normalized to ensure that realistic training images are generated.

For example, the original training samples 402 are input into the null model 406. The null model 406 does not augment the original training samples 402 or generate additional synthesized training images. Accordingly, the null model 406 outputs the original training samples 402.

When the original training samples 402 is input into the global transform model 408, each training image is augmented as a whole. However, each training image is transformed independently from other training images. The global transform model 408 applies one or both of photometric or geometric transforms to a training image. For example, a training image may be globally rotated or scaled.

The object transform within the same image model 410 relocates or otherwise transforms an object within the training image from which it originated. For example, the original training samples 402 is input into the object transform within the same image model 410. Each training image is analyzed to sequentially locate all objects within the training image to relocate each image to a different region within the same training image. Additionally, each object may be scaled according to an articulated scaling schedule.

The object transform within a different background model 412 relocates an object to a different background image. In one implementation, the training image into which the object is to be relocated may be selected based on the average grayscale intensity of the image background as compared to the grayscale intensity of the training from which the object originated. In another implementation, the training image into which the object is to be relocated may be selected based on the presence of co-occurring objects in the background.

In one implementation, for each object class, the original training samples 402 containing training images with objects from a particular class is input into each of the synthesizer models 406, 408, 410, and 412 separately. In another implementation, multiple synthesizer models 404 are applied to the training images in original training samples 402 containing objects from the particular class concurrently. The synthesized training sample sets result from application of each synthesizer model 406, 408, 410, and 412 separately or from application of a combination of the synthesizer models 406, 408, 410, and 412 are each separately input into an object recognition engine 414. The object recognition engine 414 performs object recognition operations on the received synthesized training sample set, including without limitation object detection, object segmentation, and object classification. The objection recognition engine 414 outputs object processing results into a validation engine 416. The object processing results may include detected, segmented, or classified object from the synthesized training sample set for each object type in a validation sample set.

The validation engine 416 analyzes the object processing results according to a performance measurement score (e.g., by assigning an average precision (AP) score to each synthesizer model for each object class). In one implementation the validation engine 416 presents the object recognition results to a human annotator in a graphical user interface, data readout, data stream, etc. for the annotator to assign a performance measurement score (e.g., an AP score) to a synthesizer model for each object type. The performance measurement scores and/or validation sample set are input into a model selector engine 418, which analyzes the performance measurement scores and/or validation sample set to select the synthesizer model for each object class. The model selector engine 418 selects the synthesizer model with a satisfactorily increased object recognition performance accuracy for each object class. The model selector engine 418 outputs the selected synthesizer model 420 for each object class. In one implementation, the synthesizer model 420 is applied to the original training samples 402 to obtain an enhanced training sample set from which a validated object recognition model for each object class can be constructed. In another implementation, the synthesizer model 420 is applied to a validation training samples set to obtain an enhanced training sample set.

Figure 5:
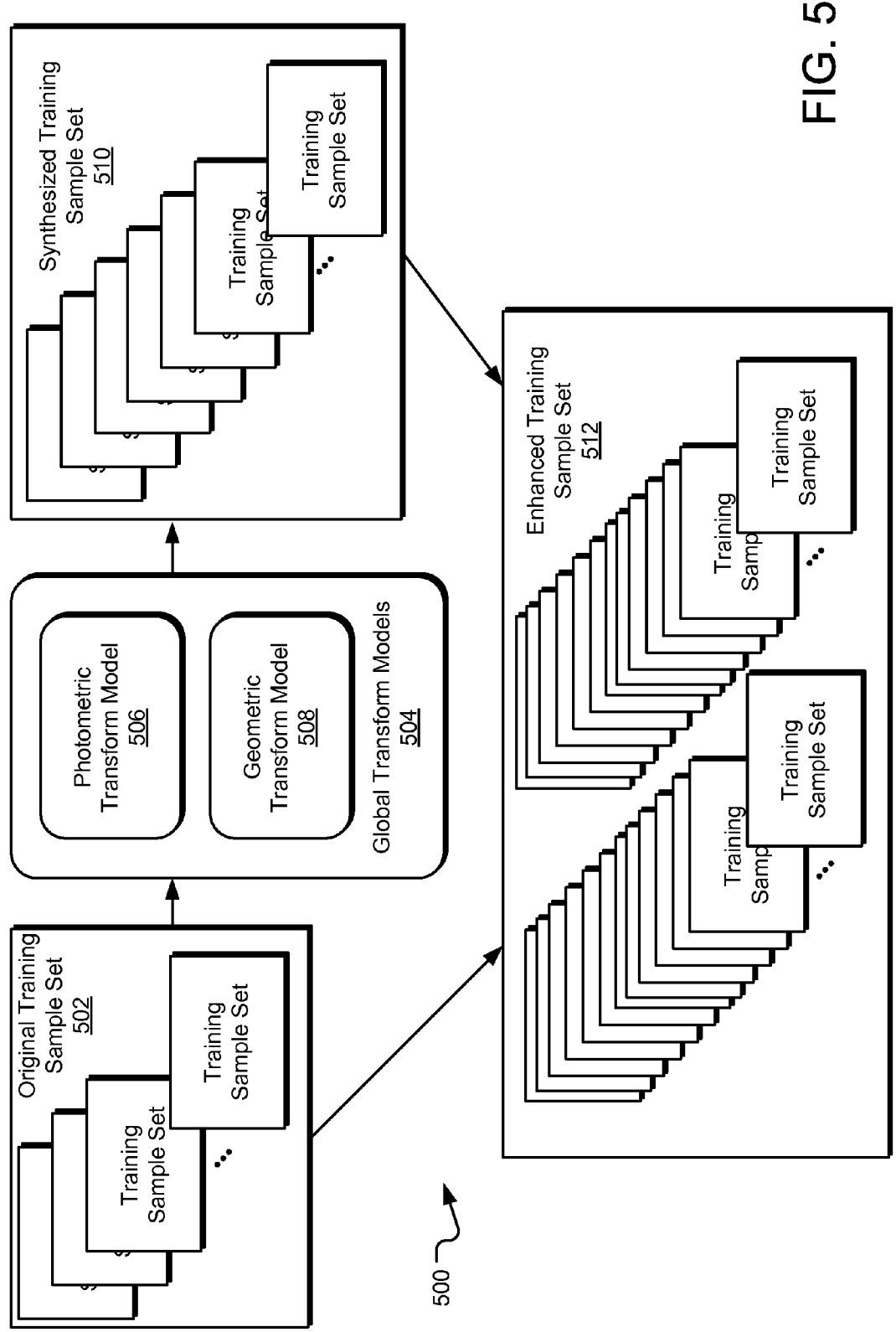
FIG. 5 illustrates an example object recognition system for introducing variations to an original training sample set based on one or more global transform models.

FIG. 5 illustrates an example object recognition system 500 for introducing variations to an original training sample set based on one or more global transform models. The object recognition system 500 includes an original training sample set 502, containing training images with objects from various object classes. The training images contained in the original training samples 502 are annotated to identify objects in each training image. One or more global transform models 504 transform or otherwise augment a given training image as a whole, including any objects and the background. The annotations are transformed with their corresponding objects and/or background.

The global transform models 504 are applied to the original training sample set 502 to generate a synthesized training sample set 510 for each object type. The global transform models 504 generate synthesized training images that introduce, for example, poses, scales, and appearances of objects of interest that are different from the training images in the original training sample set 502. In one implementation, the global transform models 504 include a photometric transform model 506 and a geometric transform model 508. The synthesized training sample set 510 includes training images generated by one or both of the photometric transform model 506 and the geometric transform model 508.

The photometric transform model 506 globally augments the appearance of a training image from the original training sample set 502 by varying the photometric characteristics, including without limitation the brightness, luminosity, color balance, and contrast, of the training image. The photometric transform model 506 applies a photometric transform independently of other training images in the original training sample set 502. The photometric transform may be linear or non-linear.

The geometric transform model 508 globally transforms a given training image from the original training sample set 502 by applying a linear or non-linear geometric transformation including without limitation rotating, flipping, or scaling the training image. In one implementation, in-plane scaling, flipping and rotation are applied independently. In another implementation, the training image is both rotated and scaled in-plane. For example, each training image in the original training sample set 502 may be rotated four times to generate four different variations of each training image. The range of the rotation angle may be dynamically set based on each particular training image, which prevents out-of-image borders. To determine the range of rotation angles for each training image, the aspect ratio of the largest object in the training image is computed. The aspect ratio is the ratio between the minimum object bounding box dimension and the maximum dimension. An additional example includes scaling each training image in the original training sample set 502 using four constant scales to generate four variations of the same training image. The selected scales may be selected experimentally to determine the necessary scaling to output a synthesized training sample set 510 that leads to higher accuracy.

The synthesized training sample set 510 may be combined with the original training sample set 502 to form an enhanced training sample set 512, which contains training images for object types that had a higher object recognition performance accuracy based on the application of one or more of the global transform models 504.

Figure 6:
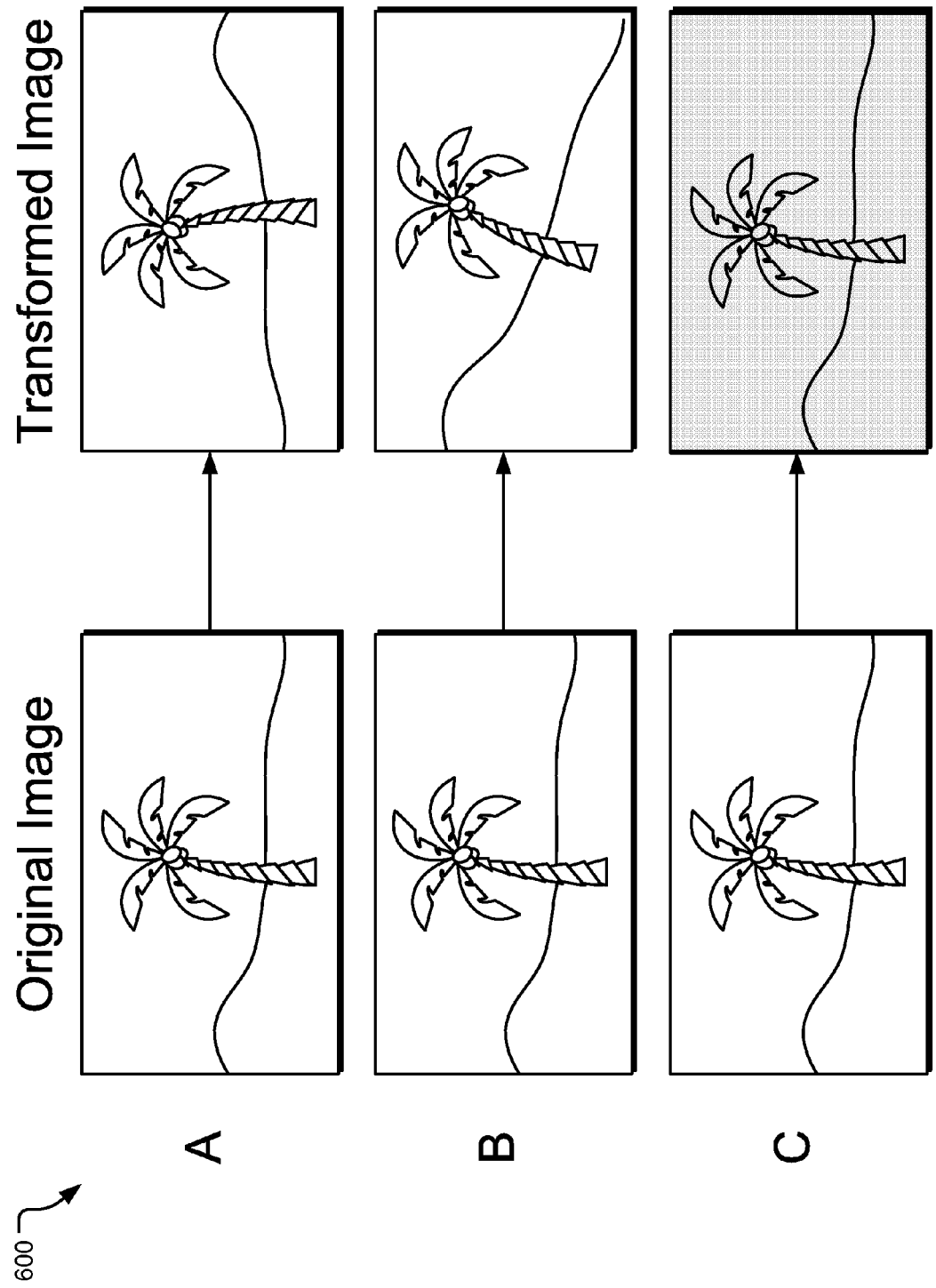
FIG. 6 illustrates example original images transformed based on global transform models.

FIG. 6 illustrates example original images transformed based on global transform models. A table 600 shows three examples A, B, and C of the application of global transform models to an original image containing a palm tree.

Example A shows the application of a geometric global transform model. The original image is flipped horizontally to generate a transformed image with a palm tree facing the opposite direction as in the original image. The transformed image provides a new pose for the palm tree.

Example B shows the original image containing the palm tree transformed by a geometric global transform model. The original image is rotated clockwise to generate a transformed image with an angled palm tree. The transformed image provides a new pose for the palm tree.

Example C shows the application of a photometric global transform model. The brightness of the original image is augmented to generate a transformed image with a palm tree that is darker than the original image. The transformed image provides a new appearance for the palm tree.

Figure 7:
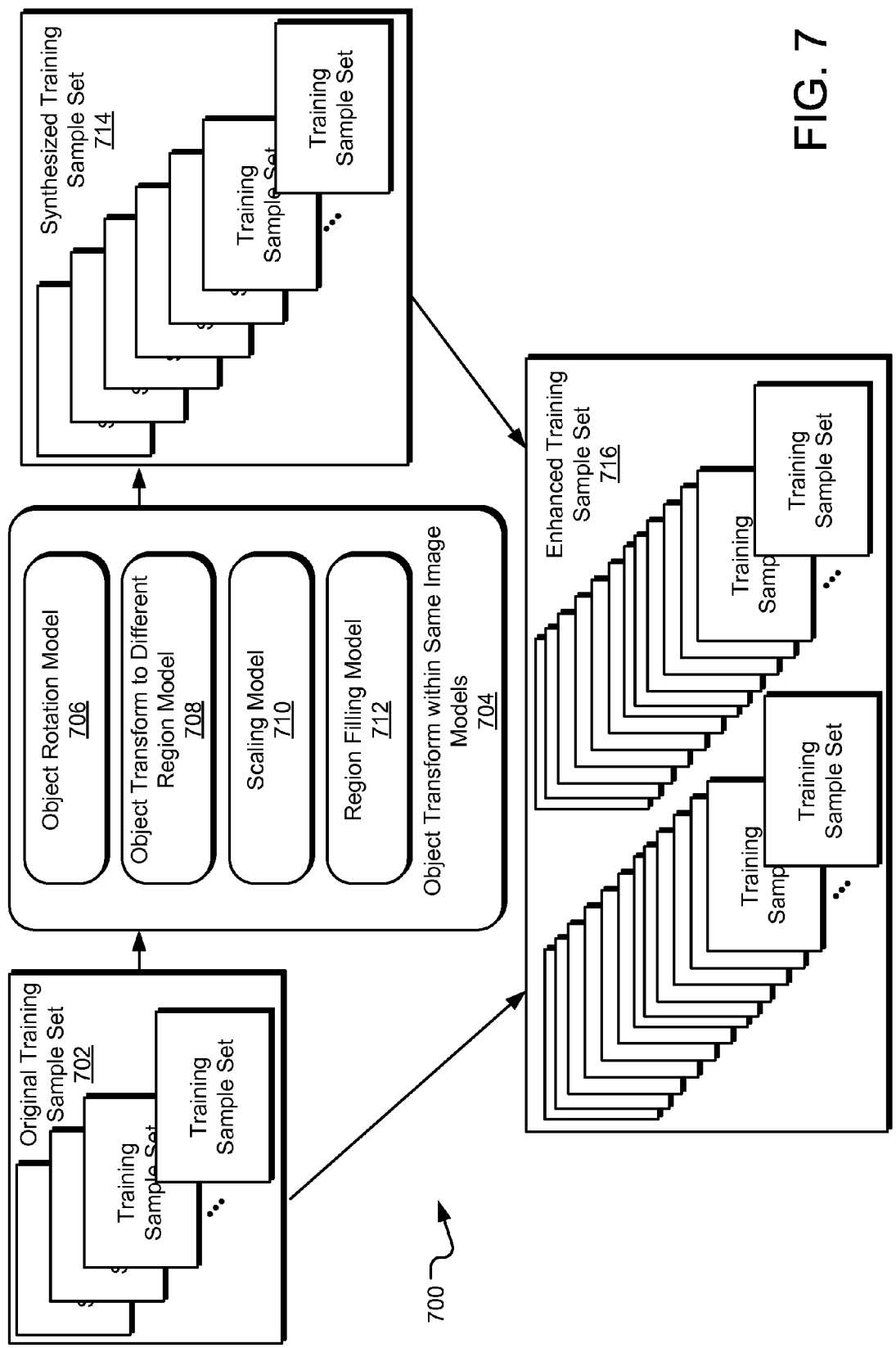
FIG. 7 illustrates an example object recognition system for introducing variations to an original training sample set based on one or more object transform within the same image models.

FIG. 7 illustrates an example object recognition system 700 for introducing variations to an original training sample set based on one or more object transform within the same image models. The object recognition system 700 includes an original training sample set 702, containing training images with objects from various object classes. The training images contained in the original training samples 702 are annotated to identify objects in each training image. If an object within a training image is transformed or otherwise augmented, the annotations corresponding to that object are also transformed.

One or more object transform within the same image models 704 are applied to the original training sample set 702 to generate a synthesized training sample set 714 for each object type. The object transform within the same image models 704 generate synthesized training images that introduce poses, scales, and contexts of objects of interest that are different from the training images in the original training sample set 702. For each training image from the original training sample set 702, all objects within the training image are processed sequentially to relocate or scale each object within the same training image. The object transform within the same image models 704 include an object rotation model 706, an object transform to a different region model 708, a scaling model 710, and a region filling model 712, which each operate to increase generalization of an object type while maintaining some image context for each object. For each of the object transform within the same image models 704, a segmentation mask may be applied to a training image to precisely identify and segment an object within the training image. However, bounding boxes and a background-foreground extraction method (e.g., GrabCut) to separate the foreground from the background within the bounding box may be employed to augment the training images with the object transform within the same image models 704.

The object rotation model 706 identifies all objects within a training image in the original training sample set 702. One by one, each object is sequentially rotated within the same training image from which the object originated. The rotations applied may include, without limitation, flipping an object horizontally, flipping an object vertically, rotating an object according to a range of rotation angles that are dynamically set based on the particular training image, or some other combination.

The object transform to a different region model 708 displaces one or more objects from a training image in the original training sample set 702 and relocates each of these objects to another region within the same training image. Placement of each object may be carefully selected to ensure that objects are not overlapping after relocation. To avoid overlapping objects, the object transform to a different region model 708 may relocate an object to a background region or a region having a large background to foreground ratio. Further, a region within the training image to relocate an object to may be chosen based on image context to ensure that variations are introduced to the original training sample set 702. For example, a car is generally shown on a road or similar region, so relocating the car to a region in the training image showing a body of water where a car would not generally be located is, for many applications, not an appropriate variation. Additionally, the object transform to a different region model 708 may be applied in combination with the scaling model 710 to ensure that an object is relocated to a region that will not result in overlapping objects.

The scaling model 710 uses constant or dynamic scales to introduce variations to all objects from a training image in the original training sample set 702. The specific scale for an object is determined based on the region in the training image into which the object is to be relocated. In one implementation, a sliding window is placed over a region in a training image to identify a target bounding box to relocate an object, with an original bounding box, from the same training image into. The target bounding box is scaled according to a scaling schedule relative to the original object bounding box. For example, 0.5, 0.75, and 1.0 may be utilized as scale down factors of the original object bounding box size. Additionally, scale up factors may also be utilized. The object is scaled according to the selected scaling factor and may be relocated to the target bounding box in a different image region.

In one implementation, the region filling model 712 increases the amount of available background within a training image in the original training sample set 702. When an object is rotated, scaled, or relocated to a different region within a training image, a hole in the training image is created. The region filing model 712 fills the pixels corresponding the hole in the training image to match the background of the training image. Accordingly, another object may be relocated to the new background image region. In another implementation, various methods of compositing an object against a new background image region may be used, including without limitation simple masking, feathering, alpha-mask blending (i.e., transparency), Poisson blending, etc.

The synthesized training sample set 714 includes training images generated by one or more of the object transform within the same image models 706, 708, 710, and 712. For example, an object may be rotated, relocated, and/or scaled, and the region from which the object was removed may be filled. The synthesized training sample set 714 may be combined with the original training sample set 702 to form an enhanced training sample set 716, which contains training images for object types that had a higher object recognition performance accuracy based on the application of one or more of the object transform within the same image models 704.

Figure 8:
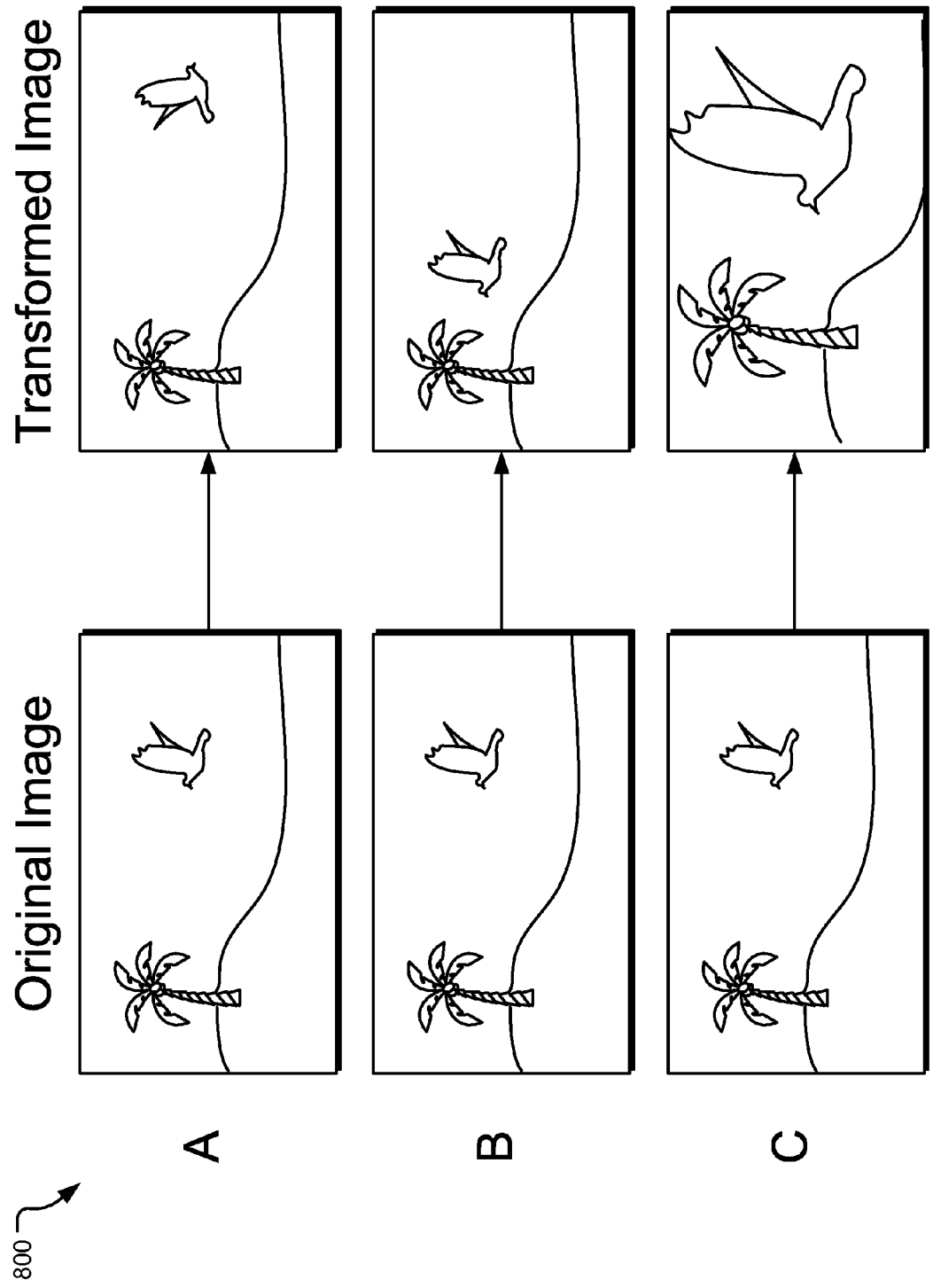
FIG. 8 illustrates example original images transformed based on object transform within the same image models.

FIG. 8 illustrates example original images transformed based on object transform within the same image models. A table 800 shows three examples A, B, and C of the application of object transform within the same image models to an original image containing a palm tree and a bird. Each of the examples A, B, and C increase the generalization for the bird object type while allowing the bird object type to maintain image context (e.g., birds are generally located around trees).

Example A shows the application of an object rotation model. The bird in the original image is flipped horizontally to generate a transformed image with the bird facing the opposite direction as in the original image. The transformed image provides a new pose for the bird, while the palm tree and the remainder of the background of the original image are un-augmented.

Example B shows the original image containing the palm tree and the bird transformed by an object transform to a different region model. The bird in the original image is displaced and relocated to a region in the original image closer to the palm tree. The transformed image provides a different background region for the bird.

Example C shows the application of an object transform to a different region model and a scaling model. The bird in the original image is displaced and relocated to a region in the original image closer to the palm tree, and the bird is scaled to maximize the background to foreground ratio. The transformed image provides a different background region and pose for the bird.

Figure 9:
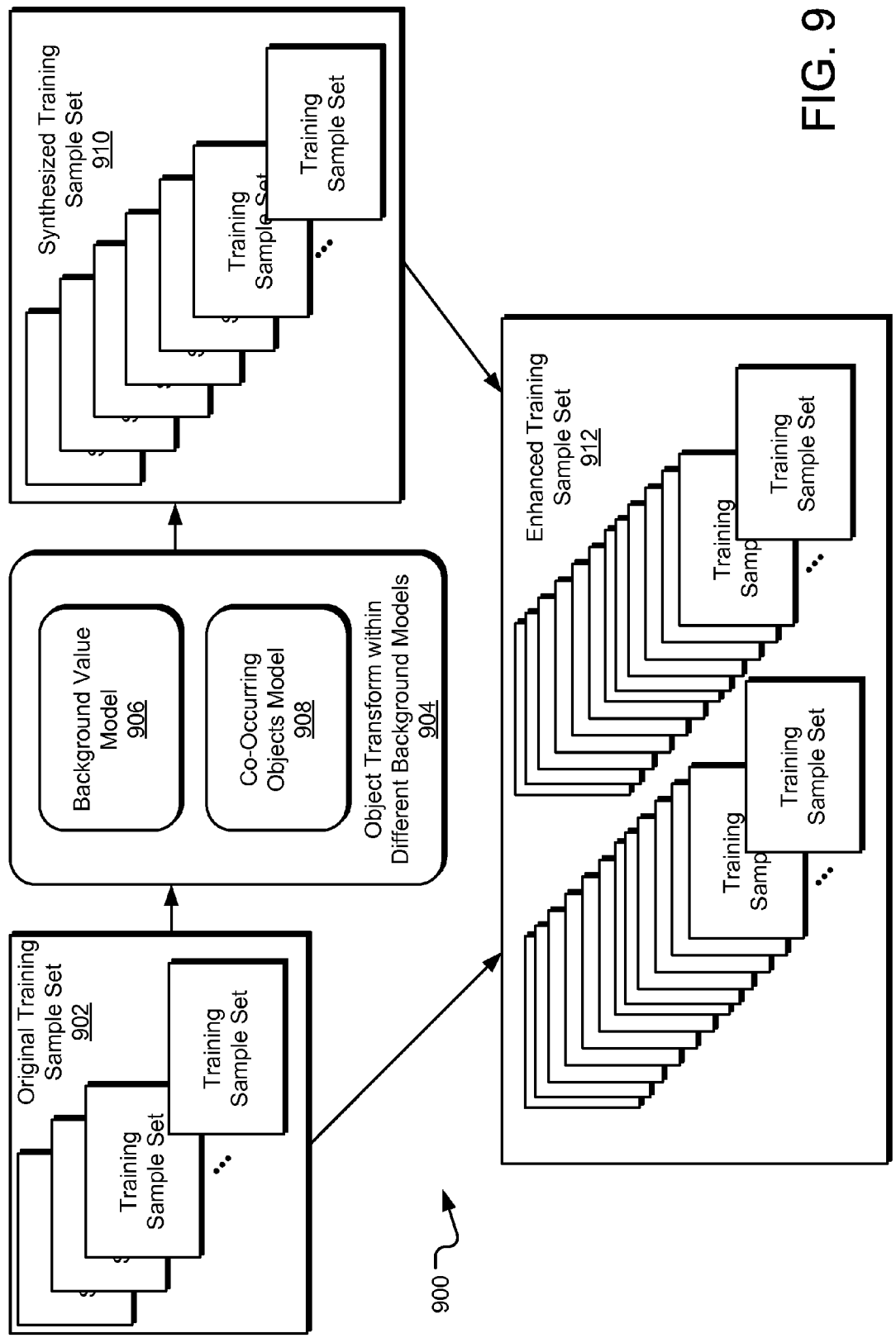
FIG. 9 illustrates an example object recognition system for introducing variations to an original training sample set based on one or more object transform within a different background models.

FIG. 9 illustrates an example object recognition system 900 for introducing variations to an original training sample set based on one or more object transform within a different background models. The object recognition system 900 includes an original training sample set 902, containing training images with objects from various object classes. The training images contained in the original training samples 902 are annotated to identify objects in each training image. If an object within a training image is transformed or otherwise augmented, the annotations corresponding to that object are also transformed.

One or more object transform within a different background models 904 are applied to the original training sample set 902 to generate a synthesized training sample set 910 for each object type. The object transform within a different background models 904 generate synthesized training images that introduce variations in the background of objects of interest that are different from the training images in the original training sample set 902. In one implementation, the object transform within a different background models 904 relocates a source object to a target image from the original training sample set 902. In another implementation, the object transform within a different background models 904 relocates a source object to a background selected from a predetermined set of images separate from the original training sample set 902. The object transform within a different background models 904 include a background value model 906, and a co-occurring objects model 908, which each operate to reduce the dependence on context for performing object recognition operations for an object by providing different scenery for an object type. For each of the object transform within a different background model 904, a segmentation mask may be applied to a training image to precisely identify and segment an object within the training image. However, bounding boxes and a background-foreground extraction method (e.g., GrabCut) to separate the foreground from the background within the bounding box may be employed to augment the training images with the object transform within a different background model 904.

The background value model 906 characterizes the background of a training image from the original training sample set 902 by its average grayscale or color intensity value $\overline{I}_B$ (average background value). A target training image into which an object is to be relocated from a source training image may be selected based on the relation between the average background value of the target training image and the source training image. In one implementation, a target training image is selected by specifying a random background value and locating training images with an average background value relatively close to the random value. In another implementation, a target training image is selected by locating training images with a $\overline{I}_B$ value relatively far from the source training image. The background value model 906 clusters the training images from the original training sample set 902 into k categories according to $\overline{I}_B$ value using a uniform quantization of the range of average background values. For each object from a source training image to be relocated, an image category index $h_s$ is computed. A target training image is selected from training images collected by applying the following rule, where $h_D$ is a destination category index:

$$h_D = h_S + \frac{k}{2}$$

Accordingly, the background model 906 bases object relocation on the farthest background appearance with varying background categories.

The co-occurring objects model 908 relocates a source object to a background region in a training image in the original training sample set 902 that contains one or more objects that are high co-occurring with the source object. The co-occurring objects model 908 provides a new background while maintaining image context of the source object by relocating it to a training image with co-occurring objects.

The target training image into which the source object is to be relocated is selected based on object co-occurrence statistics. In one implementation, the co-occurrence statistics of all objects in the original training sample set 902 are computed. For a specific object O in a source image, the top co-occurring object classes R are identified. The highest occurring co-occurring class (i.e., R=1) is identified and denoted $C_Z$. All training images belonging to the class $C_Z$ are identified and ranked according to predetermined rules. For example, if the scale of the source object O with respect to its class, denoted by $S_{Rel_O}$, is similar to the scale of the highest co-occurring object in a target training image, denoted by $S_{Rel_K}$, then the object O may be relocated into the target training image relatively easily. The relative scale of the source object O is defined as follows:

$$S_{Rel_O} = \frac{S_O - \overline{S}_{C(O)}}{\max(S_{C(O)}) - \min(S_{C(O)})}$$

$S_o$ is measured by the area of a bounding box of the object O, $\overline{S}_{C(O)}$ is the average bounding box area of the source object O's class, $\max(S_{C(O)})$ is the maximum area, and $\min(S_{C(O)})$ is the minimum of all object instances in the class of the source object O. The training images belonging to the class $C_Z$ are categorized based on their similarity with the source object O in terms of relative scale using the following rule:

$$Sim = \frac{1}{1 + (S_{Rel_O} - S_{Rel_K})^2}$$

Accordingly, the co-occurring objects model 908 relocates the source object O to a training image that is the most similar in context to the source training image based on co-occurring objects.

The synthesized training sample set 910 includes training images generated by one or more of the object transform within a different background models 906 and 908. The synthesized training sample set 910 may be combined with the original training sample set 902 to form an enhanced training sample set 912, which contains training images for object types that had a higher object recognition performance accuracy based on the application of one or more of the object transform within a different background models 904.

Figure 10:
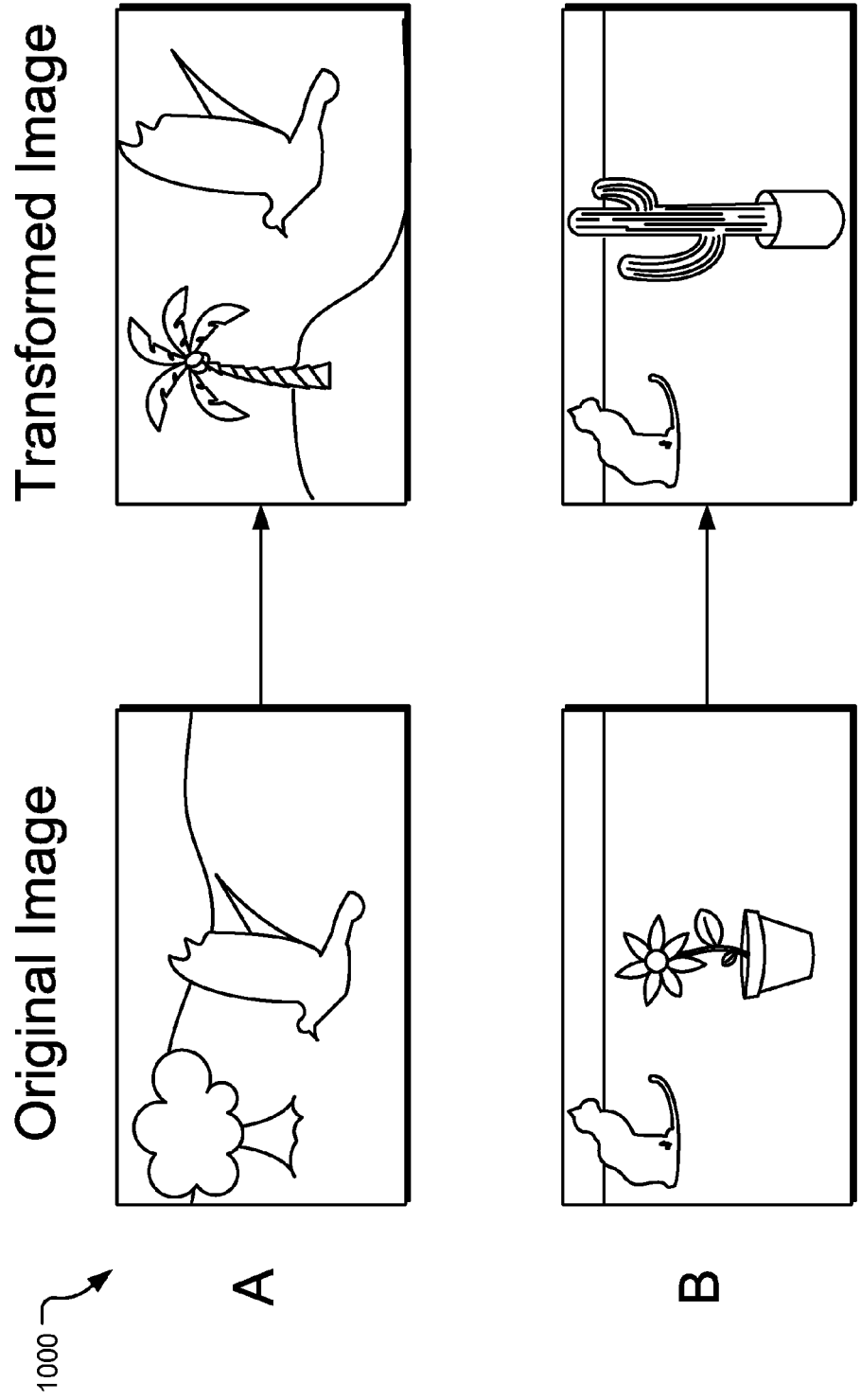
FIG. 10 illustrates example original images transformed based on object transform within a different background models.

FIG. 10 illustrates example original images transformed based on object transform within a different background models. A table 1000 shows two examples A and B of the application of object transform within a different background models to an original image.

Example A shows the application of a co-occurring objects model. The original image contains a bird flying by a tree. The co-occurring objects model determines that birds are frequently co-occurring with trees, and collects images that contain trees. The co-occurring objects model selects a target image from the collected images that is the most similar in context to the original image. The transformed image shows the bird flying near a palm tree. The transformed image provides new scenery for the bird while maintaining the context.

Example B shows an original image containing a cat and a plant transformed by a background value model. A target training image into which the cat is to be relocated is selected based on the relation between the average background value of the target training image containing the cactus and the source training image containing the plant. The transformed image provides new scenery for the cat.

Figure 11:
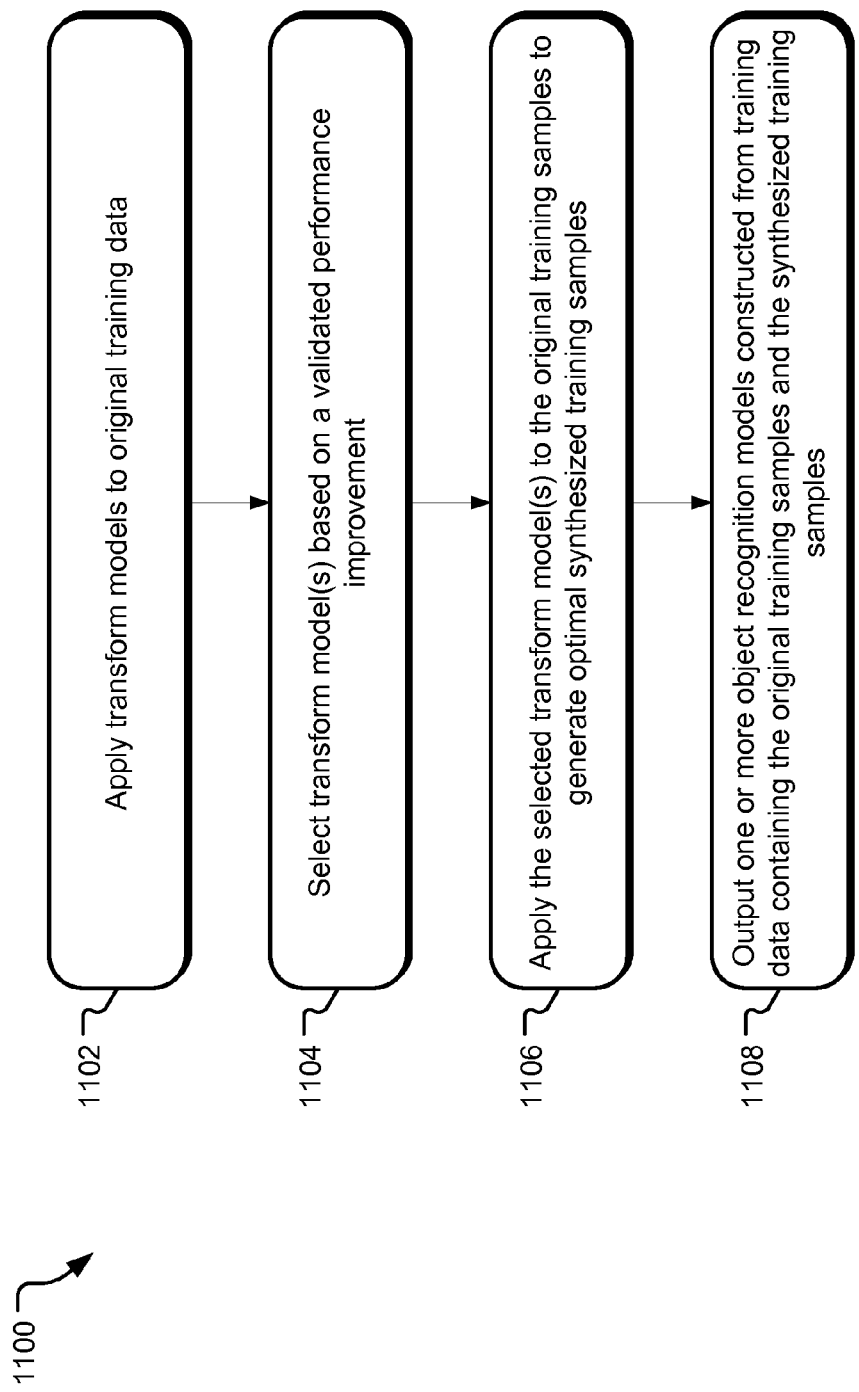
FIG. 11 illustrates example operations for identifying one or more synthesized image generating models to generate a synthesized training sample set from an original training sample set for image processing.

FIG. 11 illustrates example operations 1100 for identifying one or more synthesized image generating models to generate a synthesized training sample set from an original training sample set for image processing. An application operation 1102 applies one or more transform models to original training samples, which is a set of training images and annotations for one or more object classes. The training images contained in the original training samples are annotated by using a manual labeling method (e.g., bounding boxes) to specify which pixels in a training image belong to an instance of a specific object type (e.g., birds and trees). All pixels not belonging to a specific object in a training image are annotated as background.

In an implementation, synthesized training images are generated from the original training samples. One or more transform models, including without limitation global transform models and object-based transform models, are applied to the original training samples to generate synthesized training images. For example, the images may be globally rotated or scaled and/or an object may be relocated to a different region, either within the same image or in a different image. Different selection criteria may also be employed to determine an appropriate region into which a specific object is to be relocated.

A selection operation 1104 selects one or more transform models for each object class based on validated performance improvement. Based on the transform models, new training sample sets containing new synthesized training images that are generated from the original training samples are collected. The new training sample sets may be used to construct one or more object recognition models. However, the object recognition models based on the training sample sets may have varying degrees of performance across different object classes. Accordingly, the training sample sets based on the transform models are analyzed to arbitrate between the transform models on a per class basis. The training sample sets based on the transform models are validated by determining which of the transform models improves the performance of the object recognition operations for each object class. The transform model(s) that contain one or more variations to the original training samples which will lead to a satisfactory increase in the accuracy of the object recognition performance operations for each object class are selected. For some object classes, the original training samples, un-augmented by a transform model, may lead to an object recognition model with a satisfactorily increased accuracy. Accordingly the selection operation 1104 identifies which transform model(s), if any, should be applied to the original training samples for each object class to construct object recognition models with a satisfactorily increased performance accuracy.

An application operation 1106 applies the selected transform model(s) from the selection operation 1104 to the original training samples to generate synthesized training samples for each object class. The synthesized training samples includes training samples for each object class that may be used to construct object recognition model(s) that have a satisfactorily increased accuracy in performing object recognition operations for each class. By selecting the variations to apply to the original training samples for each object class, the accuracy of the object recognition operations is significantly increased without human input. An output operation 1108 outputs one or more object recognition models for each object class constructed from the training samples containing the original training samples and the synthesized training samples generated in the application operation 1106.

Figure 12:
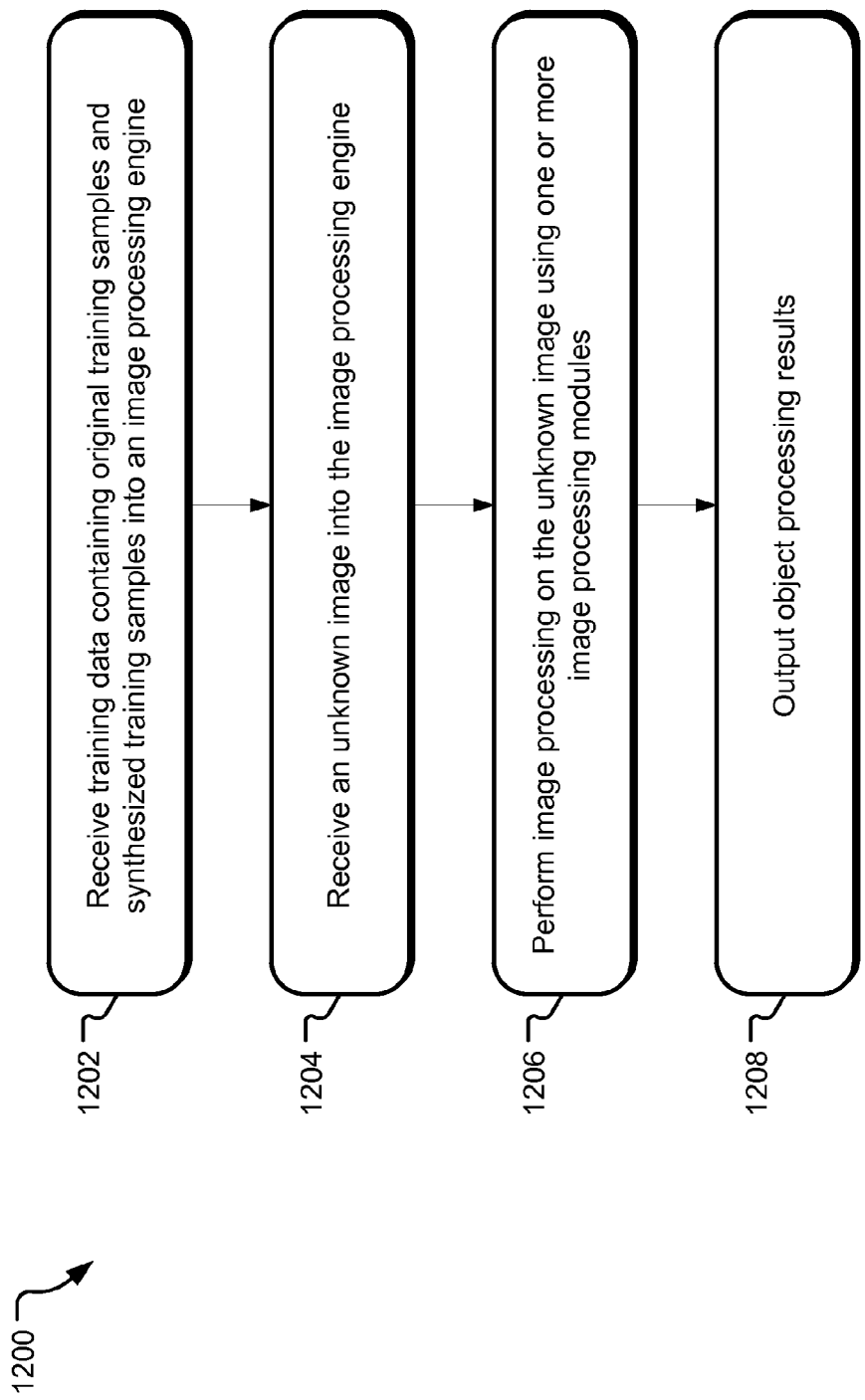
FIG. 12 illustrates example operations for performing image processing on an unknown image based on training data.

FIG. 12 illustrates example operations 1200 for performing image processing on an unknown image based on training samples. A receiving operation 1202 receives training samples containing original training samples and synthesized training samples into an image processing engine. The original training samples represent a set of training images and annotations for one or more object classes. The training images contained in the original training samples are annotated by using a manual labeling method (e.g., bounding boxes) to specify which pixels in a training image belong to an instance of a specific object type (e.g., birds and trees). All pixels not belonging to a specific object in a training image are annotated as background. The synthesized training samples includes training samples for each object class that may be used to construct object recognition model(s) that have a satisfactorily increased accuracy in performing object recognition operations for each class. The original training samples and synthesized training samples are used to train the image processing engine to perform various object recognition operations. Based on the training, the image processing engine constructs one or more object recognition models, which have satisfactorily increased performance accuracy for each object class.

A receiving operation 1204 receives an unknown image into the image processing engine. The unknown image may have one or more objects belonging to various object classes. The image processing engine implements the object recognition models constructed from the original training samples and the synthesized training samples to perform object recognition operations on the unknown image.

A performing operation 1206 performs image processing on the unknown image using one or more image processing modules. The performing operation 1206 executes the object recognition models to perform the object recognition operations, such as detection, segmentation, and classification, for various object types. Object detection locates an object in a given image and may identify the object by placing a bounding box around the object. Object segmentation precisely identifies an object in a given image by selecting which pixels in the image belong to the object. Object classification determines whether a given image contains an object belonging to a particular class.

An output operation 1208 outputs object processing results, which include one or more of a detected object, a segmented object, and/or a classified object. The output operation 1208 may present the object processing results in a graphical user interface, data readout, data stream, etc.

Figure 13:
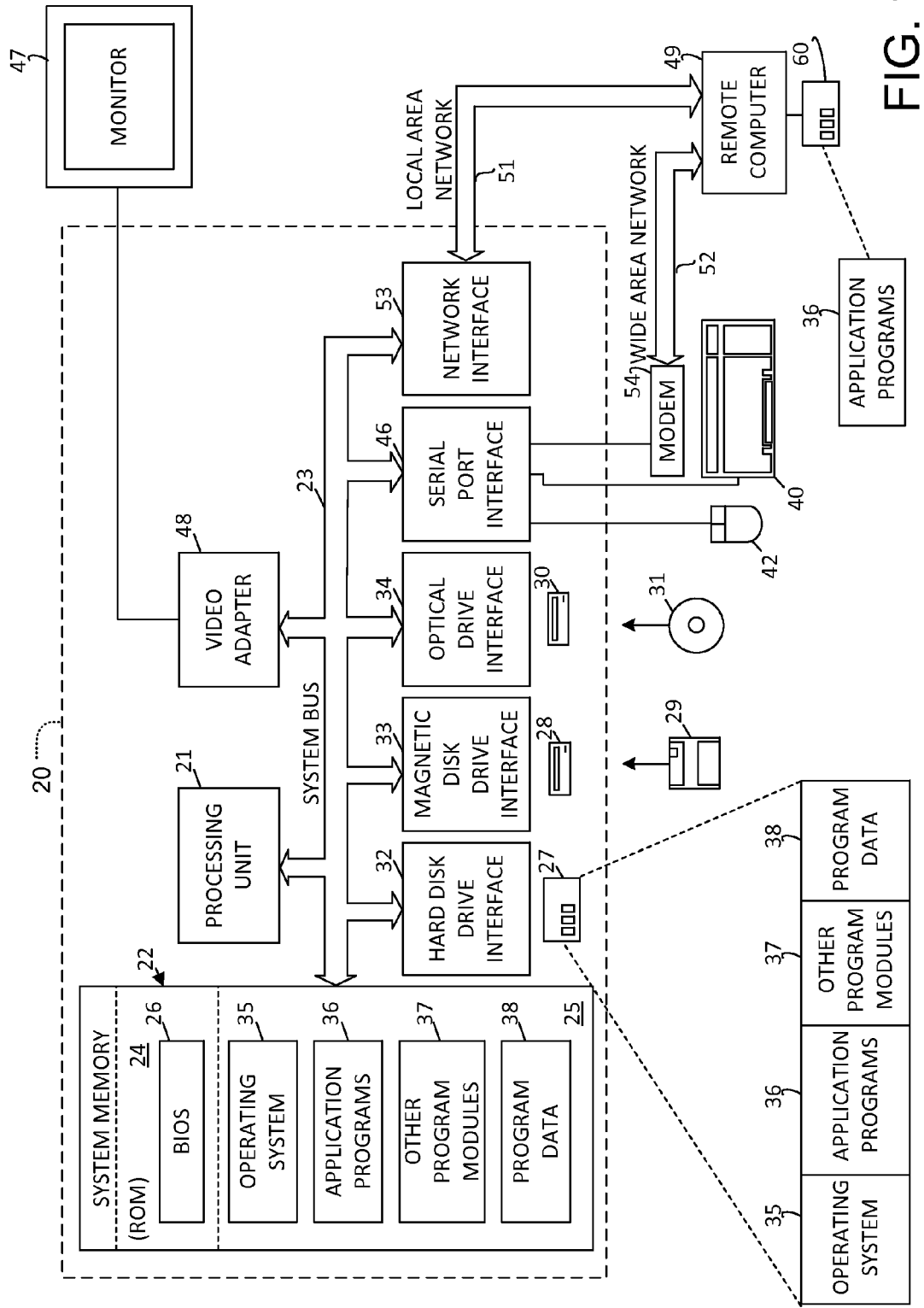
FIG. 13 illustrates an example system that may be useful in implementing the described technology.

FIG. 13 illustrates an example system that may be useful in implementing the described technology. The example hardware and operating environment of FIG. 13 for implementing the described technology includes a computing device, such as general purpose computing device in the form of a gaming console or computer 20, a mobile telephone, a personal data assistant (PDA), a set top box, or other type of computing device. In the implementation of FIG. 13, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, a DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 60 has been illustrated in FIG. 13. The logical connections depicted in FIG. 13 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, a synthesizer module, image processor engine, model selector module, and other modules and services may be embodied by instructions stored in memory 22 and/or storage devices 29 or 31 and processed by the processing unit 21. Training sample sets, unknown images, synthesized image generating models, and other data may be stored in memory 22 and/or storage devices 29 or 31 as persistent datastores.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

Although the subject matter has been described in language specific to structure features and/or methodological acts, it is to be understood that the subject matter defined in the appended claims is not necessarily limited to the specific features or acts described above. Rather the specific features and acts described above are disclosed as example forms of implementing the claims.

The above specification, examples, and data provide a complete description of the structure and use of exemplary implementations of the described technology. Since many implementations can be made without departing from the spirit and scope of the described technology, the invention resides in the claims hereinafter appended. Furthermore, structural features of the different embodiments may be combined in yet another embodiment without departing from the recited claims.

What is claimed:

1. A method comprising:
   generating synthesized training samples by applying one or more object-based transform models to original training samples, the transform models including an object-based transform model that relocates an object from a source image to a target image selected based on presence of one or more co-occurring objects between the source image and the target image;
   validating the one or more object-based transform models based on image processing accuracy for an object class, based on the synthesized training samples;
   selecting one or more object-based transform models, the selected object-based transform models having a satisfactorily increased image processing accuracy for the object class wherein the one or more object-based transform models includes an object-based transform model that relocates an object from a source image to a different image region within a background of a target image; and
   determining co-occurrence statistics of a plurality of co-occurring objects in the source image and selecting the target image from a plurality of images based on co-occurrence statistics of co-occurring objects present in the target image.

2. The method of claim 1 wherein the target image is selected based on a similarity of background value between the source image and the target image.

3. The method of claim 1 wherein the one or more object-based transform models includes an object-based transform model that scales an object.

4. The method of claim 1 wherein the one or more object-based transform models includes an object-based transform model that rotates an object.

5. One or more computer-readable storage media, wherein the one or more computer readable storage media is not a carrier wave, encoding computer-executable instructions for executing on a computer system a computer process, the computer process comprising:
   generating synthesized training samples by applying one or more object-based transform models to original training samples, the transform models including an object-based transform model that relocates an object from a source image to a target image selected based on presence of one or more co-occurring objects between the source image and the target image, wherein the one or more object-based transform models include an object-based transform model that relocates an object from a source image to a different image region within a background of the target image and wherein the target image is selected based on co-occurrence statistics of one or more co-occurring objects in the target image.

6. The one or more computer-readable storage media of claim 5 wherein the target image is selected based on a similarity of background value between the source image and the target image.

7. A system comprising:
   a synthesizer module implemented by a processor to generate synthesized training samples by applying one or more object-based transform models to original training samples, the transform models including an object-based transform model that relocates an object from a source image to a target image selected based on presence of one or more co-occurring objects between the source image and the target image, wherein the one or more object-based transforms models include an object-based transform model that relocates an object from a source image to a different image region within a background of the target image and wherein the synthesizer module is further configured to determine co-occurrence statistics for a plurality of co-occurring objects in the source image and to select the target image from a plurality of images based on co-occurrence statistics of co-occurring objects present in the target image.

8. The system of claim 7 wherein the target image is selected based on a similarity of background value between the source image and the target image.

* * * * *